(12) United States Patent
Heybroek et al.

(10) Patent No.: US 9,765,502 B2
(45) Date of Patent: Sep. 19, 2017

(54) POWER SYSTEM FOR A WORKING MACHINE

(71) Applicant: VOLVO CONSTRUCTION EQUIPMENT AB, Eskilstuna (SE)

(72) Inventors: Kim Heybroek, Kvicksund (SE); Jonas Larsson, Nyköping (SE); Karl Pettersson, Linköping (SE); Petter Krus, Vikingstad (SE)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 14/895,020

(22) PCT Filed: Jun. 3, 2013

(86) PCT No.: PCT/SE2013/000093
§ 371 (c)(1),
(2) Date: Dec. 1, 2015

(87) PCT Pub. No.: WO2014/196905
PCT Pub. Date: Dec. 11, 2014

(65) Prior Publication Data
US 2016/0115672 A1    Apr. 28, 2016

(51) Int. Cl.
*F16D 31/02* (2006.01)
*E02F 9/22* (2006.01)
(Continued)

(52) U.S. Cl.
CPC .............. *E02F 9/2217* (2013.01); *B60K 6/12* (2013.01); *B60W 10/30* (2013.01); *E02F 9/202* (2013.01);
(Continued)

(58) Field of Classification Search
CPC .......... F15B 11/17; F15B 13/06; F15B 21/14; F16H 2047/025; F16H 61/4078; F16H 61/4096; F16H 61/4061
(Continued)

(56) References Cited

U.S. PATENT DOCUMENTS 3,849,985 A * 11/1974 Ratliff ..................... B66D 1/08
60/483
4,015,679 A *  4/1977 Klitz ...................... F16H 61/40
60/483
(Continued)

FOREIGN PATENT DOCUMENTS

CN         1394273 A      1/2003
CN       101037087 A      9/2007
(Continued)

OTHER PUBLICATIONS

International Search Report (Feb. 18, 2014) for corresponding International application No. PCT/SE2013/000093.
(Continued)

*Primary Examiner* — Michael Leslie
(74) *Attorney, Agent, or Firm* — WRB-IP LLP (57) ABSTRACT

A power system for a working machine includes a transmission for driving the working machine, the transmission including a continuously variable gear box having a gear unit and a hydraulic variator unit; a work hydraulic circuit for controlling at least one hydraulic actuator of the working machine; wherein the hydraulic variator unit is hydraulically connected to the work hydraulic circuit to hydraulically transfer energy from the hydraulic variator unit to the work hydraulic circuit.

19 Claims, 8 Drawing Sheets

(51) Int. Cl.

| | |
|---|---|
| *F15B 21/14* | (2006.01) |
| *F15B 11/17* | (2006.01) |
| *B60K 6/12* | (2006.01) |
| *B60W 10/30* | (2006.01) |
| *F16H 61/4078* | (2010.01) |
| *F16H 61/4096* | (2010.01) |
| *E02F 9/20* | (2006.01) |
| *F16H 47/04* | (2006.01) |
| *F15B 11/16* | (2006.01) |
| *F15B 13/06* | (2006.01) |
| *F15B 21/08* | (2006.01) |
| *F16H 47/02* | (2006.01) |

(52) U.S. Cl.
CPC .......... *E02F 9/2253* (2013.01); *E02F 9/2267* (2013.01); *E02F 9/2292* (2013.01); *E02F 9/2296* (2013.01); *F15B 11/16* (2013.01); *F15B 11/17* (2013.01); *F15B 13/06* (2013.01); *F15B 21/08* (2013.01); *F15B 21/14* (2013.01); *F16H 47/02* (2013.01); *F16H 47/04* (2013.01); *F16H 61/4078* (2013.01); *F16H 61/4096* (2013.01); *F15B 2211/255* (2013.01); *F15B 2211/265* (2013.01); *F15B 2211/40* (2013.01); *F15B 2211/625* (2013.01); *F15B 2211/63* (2013.01); *F15B 2211/7058* (2013.01); *F16H 2047/025* (2013.01); *Y02T 10/6208* (2013.01); *Y02T 10/76* (2013.01)

(58) Field of Classification Search
USPC .......................................................... 60/483
See application file for complete search history.

(56) References Cited

U.S. PATENT DOCUMENTS

| | | | |
|---|---|---|---|
| 5,435,135 A | * | 7/1995 | Lallier .................. F03C 1/045 60/483 |
| 2006/0145482 A1 | | 7/2006 | Roethler et al. |
| 2008/0081734 A1 | | 4/2008 | Duffy et al. |
| 2010/0298081 A1 | | 11/2010 | Ivanysynova et al. |
| 2011/0031053 A1 | | 2/2011 | Carl et al. |
| 2013/0123055 A1 | | 5/2013 | Mattsson et al. |

FOREIGN PATENT DOCUMENTS

| | | |
|---|---|---|
| CN | 101873945 A | 10/2010 |
| DE | 102004048475 A1 | 4/2006 |
| EP | 1898131 A1 | 3/2008 |
| EP | 2006146 A2 | 12/2008 |
| WO | 2009057082 A2 | 5/2009 |

OTHER PUBLICATIONS

International Preliminary Report (Sep. 16, 2015) for corresponding International application No. PCT/SE2013/000093.

European Official Action (Dec. 8, 2016) for corresponding European App. EP13886428.

Chinese Official Action (Jun. 2, 2017) for corresponding Chinese App. 201380077140,2.

* cited by examiner

POWER SYSTEM FOR A WORKING MACHINE

BACKGROUND AND SUMMARY

The invention relates to a power system and to a working machine comprising such a power system.

The invention is applicable on working machines within the fields of industrial construction machines, in particular wheel loaders, articulated haulers and excavators. Although the invention will be described hereinafter with respect to a wheel loader, the invention is not restricted to this particular machine, but may also be used in other heavy working machines, such as dump trucks, or other construction equipment.

A working machine is typically provided with an internal combustion engine for propulsion of the working machine via a gear box, and for providing power w one or more auxiliary hydraulic systems of the working machine. Such hydraulic systems can include steering and one or more working hydraulic circuits of a working machine.

One or more hydraulic pumps can be used to provide hydraulic power to the one or more hydraulic systems of the working machine, and the pumps may typically be powered by the internal combustion engine of the working machine through a power take off (PTO) connected to a main shaft of the engine.

The power system of a working machine must be able to provide power to at least two different mechanical loads, where propulsion is an example of a rotary load, and a work hydraulic system is an example of a linear load when it is provided in the form in the form of one or more linear hydraulic actuators, i.e. hydraulic cylinders powering a lifting motion of an arm or a bucket. In other cases the work hydraulics could instead contain rotary loads, i.e. hydraulic motors powering a swing function of an excavator or a saw motor.

Furthermore, there is an increasing interest in improving the energy efficiency of working machines as the operational cost of a working machine is related to the fuel consumption and as environmental concerns limits the amount of contaminants that may be released by the working machine.

Taking a wheel loader as an example, the hydraulics system is connected to a PTO on the drive shaft of the engine and so is the input axle to the transmission of the propulsion system. The transmission system may for instance be based on a hydrodynamic torque converter which torque output depends on the differential speed between its incoming and outgoing axles. The pumps of the hydraulic system could have fixed or variable displacement.

With this system architecture the rpm of the engine determines the rpm of the hydraulic machine, but at the same time it also determines the speed of the input axle to the propulsion system. This means that the maximum flow of the hydraulic machine is limited by the engine speed and so is the transmission torque. In some cases high hydraulic flow is needed, but the torque request on the propulsion is low, a high engine speed is needed to satisfy the hydraulic system, which will lead to big power losses over the torque converter since the operator will stop the machine from going forward by applying the friction brakes, and heat will be generated over the torque converter. Also the other way around can be a problem; the propulsion system requires a high engine rpm to perform the commanded torque output, while the hydraulics only has a very small flow demand. This situation will also cause problems, but this time power losses occur in the hydraulic system, since the hydraulic machine must operate at partial displacement, where the efficiency is lower compared to when operating, at full flow.

Other issues in the motion systems of most construction machines today is that kinetic energy stored in the mass of a moving machine is not recovered when the machine is decelerated, nor is the potential energy of an elevated load recovered when the load is lowered. Today this kinetic and potential energy is generally wasted as heat over friction brakes and hydraulic resistances. To solve these problems, the power system needs to be complemented with some sort of energy recovery system and in case energy should be stored over time also an energy storage system is needed.

Furthermore, it is desirable to increase the efficiency of the components in the hydraulic circuit including the power take-off, where hydraulic mechanical energy is converted into hydraulic, energy.

A proposed approach for increasing the energy efficiency in a power system is to provide a hydraulic system for the work hydraulics of a working machine where a hydraulic accumulator is connected to the same hydraulic node as the hydraulic machine of the power take-off for providing hydraulic energy to the work hydraulics. Thereby, excess hydraulic energy can be stored in the accumulator. For example, energy can be recuperated from the work hydraulic system. This may facilitate a reduction in size of the hydraulic machine, which in turn leads to increased energy efficiency.

However, even though more energy efficient components and systems are developed, there is still a need for a more energy efficient power system for a working machine.

It is desirable to provide a power system for a working machine energy may be recuperated m a more efficient manner using a power system with reduced complexity compared to prior art solutions.

According to a first aspect of the present invention, it is therefore provided a power system for a working machine. The power system comprises a transmission for driving the working machine, which transmission comprises a gear box having a gear unit and a hydraulic variator unit.

Furthermore, the power system comprises a work hydraulic circuit for controlling at least one hydraulic actuator of the working machine, and the power system is characterized in that the hydraulic variator unit is hydraulically connected to the work hydraulic circuit to hydraulically transfer energy from the hydraulic variator unit to the work hydraulic circuit.

The transmission is configured to be connected to a prime mover of the working machine, such as an internal combustion engine, for providing propulsion of the working machine. The continuously variable gear box comprises a hydraulic variator unit system which is operatively coupled to the mechanical gear unit by at least a first planetary gear train. Thereby, energy may be transferred from the engine to an output shaft of the gear box both via a mechanic path as well as via a hydraulic path. That the gear box is a continuously variable gearbox gives a plurality of advantages in relation to a stepped gearbox. For example, the velocity of the working machine can be controlled independently of the speed of rotation of the prime mover.

Furthermore, if the continuously variable transmission has a speed of rotation range comprising a mode where the rotation speed of the output shaft of the gearbox is zero or close to zero independently of the rotation speed of the input shaft of the gearbox at the same time as torque can be transmitted from the input shaft to the output shaft (usually referred to as an infinitely variable transmission (IVT) with geared neutral), the torque converter traditionally used in some working machines can be omitted.

A variable gear box of the type referred to herein, where power is split up into a mechanical patch and a hydraulic path, may also be referred to as a power-split continuously variable transmission (PS-CVT) gear box.

The work hydraulic circuit may for example comprise one or more hydraulic actuators for providing functions of the working machine such as lifting a load or steering.

The present invention is based on the realization that the hydraulic variator unit of a transmission in a working machine may be used also for providing hydraulic energy to a work hydraulic circuit of the working machine. Accordingly, there is no need for a separate power take-off and the hydraulic machine normally used for providing power to the work hydraulics is no longer required. Thereby, a power system is provided requiring fewer components, and which system can thus be made at a lower cost.

Furthermore, a continuously variable transmission is advantageously used in a power system according to the present invention as separation of operation of a hydraulic system from the propulsion of the working machine is facilitated, since the hydraulic system can be powered by an input shaft, which may be kept running, while an output shaft connected to propulsion drive train can be kept at stand still.

Accordingly, a pressure level required by the work hydraulic circuit can be provided by controlling the prime mover and the hydraulic variator unit.

According, to one embodiment of the invention, the power system may further comprise a hydraulic energy storage hydraulically connected to the hydraulic variator unit. Furthermore, the power system may be further configured to hydraulically transfer energy from the variator unit to the hydraulic energy storage. The hydraulic energy storage may for example be a hydraulic gas accumulator.

Moreover, the power system may further be configured to hydraulically transfer energy from the hydraulic energy storage to the work hydraulic circuit. Accordingly, energy transfer from the variator unit to the work hydraulic circuit may take place via the hydraulic energy storage. Whether the energy transfer from the variator unit to the work hydraulic circuit is taking place via the hydraulic energy storage or not may be controlled by valve means suitably arranged in the power system.

It is further realized that it is advantageous to share a hydraulic energy storage between the hydraulics based transmission and the work hydraulics of a working machine, where a common hydraulic machine is used for both the transmission and the work hydraulics. By using a solution comprising an accumulator for storing and releasing energy, for providing power to the work hydraulic circuit, it is possible to reduce the size of the overall power supply system, i.e. of the engine and of hydraulic machines of the variator unit.

Reducing the size of the engine and/or of the hydraulic, machine again lead to a power system which can be made at a lower cost, and to a working machine having an improved energy efficiency and thereby a reduced fuel consumption.

According to one embodiment of the invention, the power system may be configured to hydraulically transfer energy from the work hydraulic circuit to the hydraulic energy storage.

Furthermore, the power system may be configured to hydraulically transfer energy from the work hydraulic circuit to the hydraulic variator unit. Thus, further advantages can be found as energy may be recuperated both from the propulsion system and from the work hydraulics, and the recuperated energy may either be used or stored in the energy storage.

Accordingly, the power system according to various embodiments of the invention may in the end lead to both a substantial reduction in fuel consumption of the working machine and to a power system which comprises fewer parts.

In one embodiment of the invention, the hydraulic variator unit may comprise a first hydraulic machine and a second hydraulic machine, and at least one of the first hydraulic machine and the second hydraulic machine is hydraulically connected to the work hydraulic circuit. The chosen design of the mechanical gearbox connected to variator the hydraulic machines sets the requirements on which type of hydraulic machines that should be used inside the variator unit. However, to get the full advantage of the invention it is recommended that hydraulic machines are capable of reversed power flow transformation (in order to support recuperation of energy). This implies the use of a hydraulic machine that can operate in at least in two quadrants, meaning both as a pump and as a motor. The practical way to solve this is to adopt hydraulic machines that allow a reversed flow direction (through negative displacement capability). This type of machine is commonly referred to as "open circuit, over-center machines" which is commonly used in "secondary control system" applications. However the motoring capability can also be achieved with a machine only capable of unidirectional flow capability, but in this case the reversed power flow must be achieved through switching valves, changing side of pressurization of the hydraulic machines. For this solution another type of hydraulic machine is needed, since there is no longer any predetermined high and low pressure side. This type of machine is commonly referred to as a closed-circuit hydraulic machine.

According to one embodiment of the invention, at least one of the first hydraulic machine and the second hydraulic machine may be hydraulically connected to the hydraulic energy storage. In a conventional system, if the same hydraulic energy storage is used by the driveline and the work hydraulics, where the work hydraulics is powered by a power take-off and a separate hydraulic machine, there may be problems as the hydraulic machine of the work hydraulic must be of significant size to be able to be handle powers coming back from the propulsion system. According to the present embodiment, one or both of the hydraulic machines can be used to transfer power to both the driveline for propulsion and to the work hydraulics, thereby making the power limitation encountered in prior art solutions less of a problem. Furthermore, fewer power transformations are required when recuperating energy from the propulsion system compared to prior art solutions. Hence, higher recuperation efficiency is expected.

According to one embodiment of the invention, the power system ma further comprise a control unit configured to maintain a pressure level of the hydraulic energy storage within a first predetermined range. The control unit can he active to control the hydraulic flow in the system such that a pressure level of the hydraulic accumulator is maintained above a predetermined minimum value and below a predetermined maximum value. For example, if the pressure level of the hydraulic accumulator is approaching its minimum value, the engine can be activated to provide hydraulic flow via the variator unit to the accumulator so that the pressure level of the accumulator is increased. Furthermore, if the pressure level of the hydraulic accumulator is below its maximum value, and if the power system is in a mode where energy may be recuperated, either from the propulsion of from the work hydraulics, the control unit may advantageously redirect recuperated energy to the hydraulic accumulator. The control unit may be any unit suitable for controlling functions in a hydraulic system such as a microprocessor or the like configured to control for example the variator unit or a separate accumulator charging system to control pressure levels in one or more hydraulic accumulators.

In one embodiment of the invention, the power system may further comprise a second hydraulic energy storage hydraulically connected to the hydraulic variator unit and to the work hydraulic circuit. The second accumulator could also advantageously be connected to the low pressure side of the work hydraulic system. The main reason to use a low pressure accumulator is to maintain a sufficiently large pressure on the suction side of any reciprocating hydraulic element, such as a pump or cylinder in order to avoid cavitation. If a second accumulator is not used in the system, the normal solution is instead to use a hydraulic tank pressurized by atmospheric pressure.

Furthermore, the control unit may advantageously be configured to maintain a pressure level of the second hydraulic energy storage within a second predetermined range different from the first predetermined range. By providing hydraulic accumulators having different pressure levels, different components of the work hydraulic circuit requiring different hydraulic pressure may be powered by different hydraulic accumulators.

According to one embodiment of the invention, the variator unit may advantageously be input coupled. That the hydraulic machine is input coupled means that one hydraulic machine of the variator unit is coupled to the input shaft of the gear box.

According to one embodiment of the invention, the variator unit may advantageously be output coupled. That the hydraulic machine is output coupled means that one hydraulic machine of the variator unit is coupled to the output shaft of the gear box. However, the variator unit may advantageously also be connected in a variable bridge. The variable bridge is characterized by a four axle planetary gear-set to which input and output as well as two hydraulic machines are connected. The planetary gear-set consist of or comprises two planetary gears connected together. With this configuration many combinations exist to how two planetary gears can be connected together.

In one embodiment of the invention, the work hydraulic circuit may advantageously comprise a digital hydraulic actuator. A digital hydraulic actuator refers to an actuator comprising a cylinder having different effective areas, which are connected to the hydraulic circuit so that different discrete pressure levels may be provided to the different areas in order to provide different load levels of the actuator. Typically, discrete pressure levels are provided by hydraulic accumulators. As no throttling is required to achieve different load levels, the energy efficiency of a digital hydraulic actuator is improved in relation to a conventional hydraulic actuator. Furthermore, it is particularly advantageous to include a digital actuator in a power system according to various embodiments of the present inventions as the one or more accumulators already included in the power system also may be used for providing different discrete pressure levels to the digital actuator.

According to one embodiment of the invention the hydraulic variator unit may advantageously comprise a primary hydraulic machine and a secondary hydraulic machine, wherein at least one of the primary hydraulic machine and the secondary hydraulic machine is hydraulically connected to the work hydraulic circuit; and wherein at least one of the primary and secondary hydraulic machine comprises: a first rotating hydraulic machine and a second rotating hydraulic machine, the first and second hydraulic machine being arranged to provide a torque via a common output shaft; a first valve means for providing a differential hydraulic pressure level over the first hydraulic machine by using two sources of hydraulic fluid having different hydraulic pressure levels; a second valve means for providing a differential hydraulic pressure level over the second hydraulic machine by using two sources of hydraulic fluid having different hydraulic pressure levels; a control unit configured to control the first valve means and the second valve means such that different discrete levels of torque are provided via the output shaft.

Different discrete levels of torque can advantageously be provided by applying a differential pressure over two separate hydraulic machines which are connected to the same output shaft. The first hydraulic machine may have a first fixed displacement and the second hydraulic machine may have a second fixed displacement, the second fixed displacement may be the same as or different from the first fixed displacement. By using only fixed displacement hydraulic machines instead of variable displacement hydraulic machines, a more energy efficient power system can be achieved.

Furthermore, by using hydraulic machines having different fixed displacement connected to a common output shaft, the number of discrete torque levels that can be provided is increased.

According to one embodiment of the invention, the first hydraulic machine may be a fixed displacement hydraulic machine and the second hydraulic machine may be a variable displacement hydraulic machine. It may be advantageous to use a variable displacement hydraulic machine in combination with one or more fixed displacement hydraulic machines in order to be able to provide a continuously variable output torque.

In one embodiment of the invention, the differential hydraulic pressure level may be provided by using a first hydraulic accumulator having a first hydraulic pressure level and a second hydraulic accumulator having a second hydraulic pressure level, the first hydraulic pressure level being different from the second hydraulic pressure level. By using hydraulic accumulators for providing hydraulic fluid to the hydraulic machines via valve means, energy may be recuperated from the output shaft, via the hydraulic machines and stored in the accumulator, thereby increasing the energy efficiency of the power system. In embodiments where two or more hydraulic accumulators are used in combination with a variable displacement hydraulic machine, it may be sufficient that only the hydraulic accumulator having the highest pressure is connected to the variable displacement hydraulic machine, and the low pressure side of the variable displacement hydraulic machine may then be connected to the accumulator having the lowest pressure, or to a tank representing the low pressure source. However, it may be advantageous to connect all hydraulic accumulators also to the variable displacement hydraulic machine in order to provide increased flexibility during operation of the power system. A further advantage of using one or more hydraulic accumulators in the power system is that it is possible to downsize the supply unit providing energy to the system, as such a supply unit can be dimensioned to handle the average energy requirement while one or more hydraulic accumulators can provide energy to accommodate peak loads.

According to one embodiment of the invention the hydraulic variator unit may advantageously comprise a primary hydraulic machine and a secondary hydraulic machine, wherein at least one of the primary hydraulic machine and the secondary hydraulic machine is hydraulically connected to the work hydraulic circuit; and wherein at least one of the primary and secondary hydraulic machine comprises: a rotating hydraulic machine arranged to provide a torque via an output shaft; a first valve means for providing a first differential hydraulic pressure level over the hydraulic machine by using two sources of hydraulic fluid having different hydraulic pressure levels, a second valve means for providing a second differential hydraulic pressure level over the hydraulic machine by using two sources of hydraulic fluid having different hydraulic pressure levels, an absolute value of the second differential hydraulic pressure level being different from an absolute value of the first differential hydraulic pressure level; and a control unit configured to control the first valve means and the second valve means such that different discrete levels of torque are provided via the output shaft. It is possible to provide different discrete levels of torque by applying a different differential pressures over a hydraulic machine using discrete pressure levels to achieve the different differential pressures.

In one embodiment of the invention, the rotating hydraulic machine may advantageously have a fixed displacement. Thereby, the output torque is controlled through the different discrete differential pressures which may be applied over the fixed displacement hydraulic machine.

In one embodiment of the invention, the power system may advantageously comprise a first source of hydraulic fluid having a first hydraulic pressure level, a second source of hydraulic fluid having a second hydraulic pressure level different from the first pressure level, and a third source of hydraulic fluid having a third hydraulic pressure level different from the first and the second pressure level; wherein the first valve means and the second valve means use one source of hydraulic fluid in common. Through the use of three different sources of hydraulic fluid having different pressure levels, a plurality of different differential pressures can be applied over the fixed displacement hydraulic machine in order to provide different discrete levels of output torque on the output shaft.

Furthermore a difference in pressure between the second pressure level and the third pressure level is advantageously substantially twice the difference between the first pressure level and the second pressure level. By selecting the difference between the highest and the middle of the pressure levels to be twice the size of the difference between the lowest pressure level and the middle pressure level, an optimal number of equidistant levels of output torque can be provided.

Furthermore, there is provided a working machine comprising a power system according to any of the aforementioned exemplary embodiment.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional features and advantages of the present invention, will be better understood through the following illustrative and non-limiting detailed description of exemplary embodiments of the present invention, wherein:

FIGS. 7$a$-$c$ shows more detailed illustrations of a configuration of a gear box in a power system according to example embodiments of the invention;

FIGS. 10$a$-$b$ schematically illustrates a hydraulic system according to an example embodiment of the invention.

DETAILED DESCRIPTION

Figure 1:
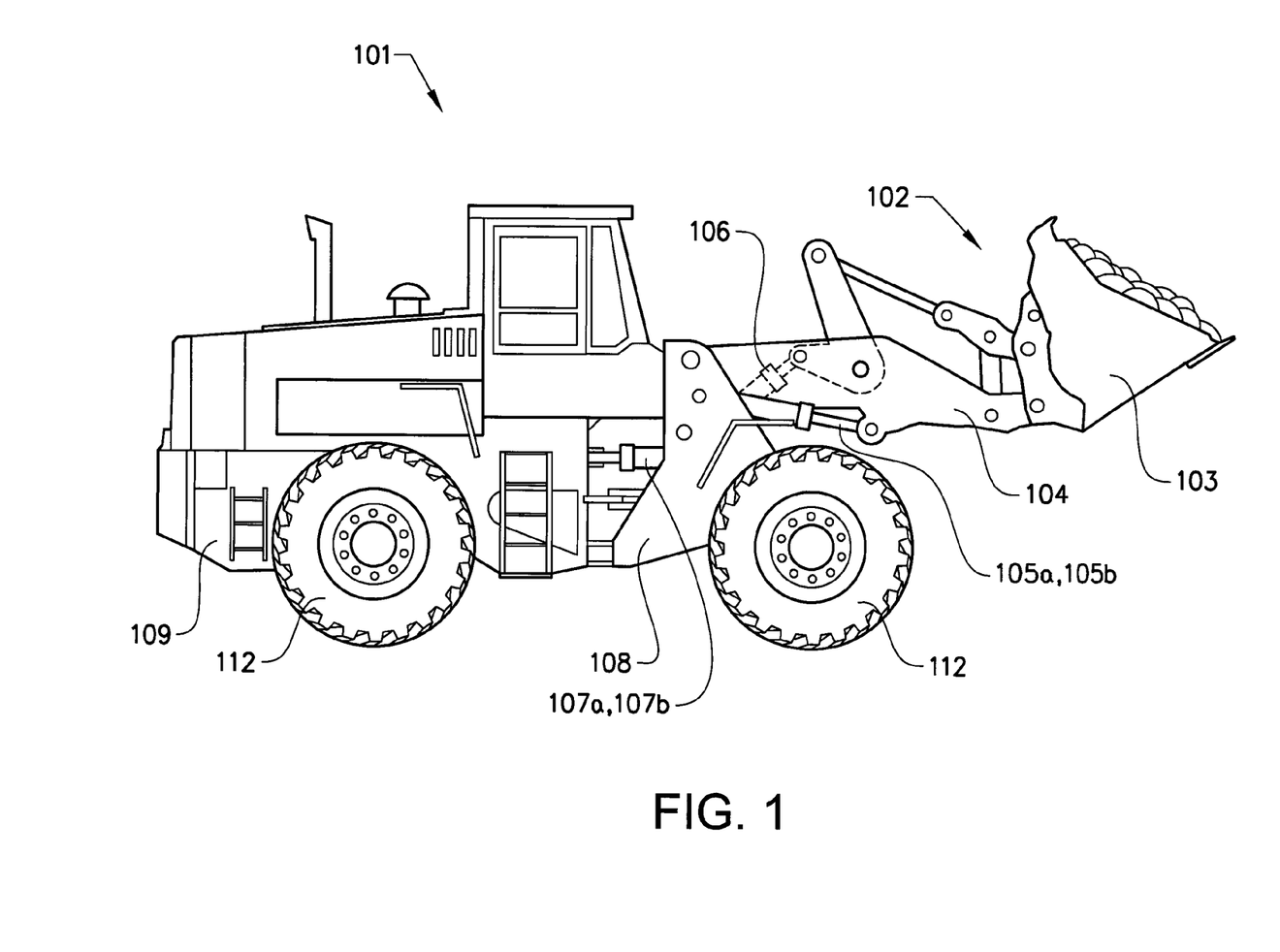
FIG. 1 is a lateral view illustrating an example embodiment of a working machine in the form of a wheel loader having a bucket for loading operations, and a hydraulic system for operating the bucket and steering the wheel loader.

In the present detailed description, various embodiments of a power system according to the present invention are mainly discussed with reference to a power system for a wheel loader. It should however be noted that this by no means limits the scope of the present invention which is equally applicable to power systems in other types of working machine or vehicle Reference is now made to FIG. 1, illustrating a working machine 101, here in the form of a wheel loader having an implement 102. The term "implement" is intended to comprise any kind of tool using hydraulics, such as a bucket, a fork or a gripping, tool arranged on a wheel loader, or a container arranged on an articulated hauler. The implement illustrated comprises a bucket 103 which is arranged on an arm unit 104 for lifting and lowering the bucket 103, and further the bucket 103 can be tilted or pivoted relative to the arm unit 104. The wheel loader 101 is provided with a hydraulic system for example to lift and tilt the bucket. In the example embodiment illustrated in FIG. 1 the hydraulic system comprises two hydraulic cylinders 105$a$, 105$b$ for the operation of the arm unit 104 and a hydraulic cylinder 106 for tilting the bucket 103 relative to the arm unit 104. Furthermore the hydraulic system comprises two hydraulic cylinders 107$a$, 107$b$ arranged on opposite sides of the wheel loader for turning the wheel loader by means of relative movement of a front body part 108 and a rear body part 109. In other words; the working machine is framesteered by means of the steering cylinders 107$a$, 107$b$.

The working machine 101 is also provided with a prime mover, such as an internal combustion engine, and a driveline with a gearbox for supplying power to the driving wheels 112 of the working machine 101.

The gearbox is a continuously variable transmission which gives a plurality of advantages in relation to a stepped gearbox. For example, the velocity of the working machine 101 can be controlled independently of the speed of rotation of the prime mover.

Figure 2:
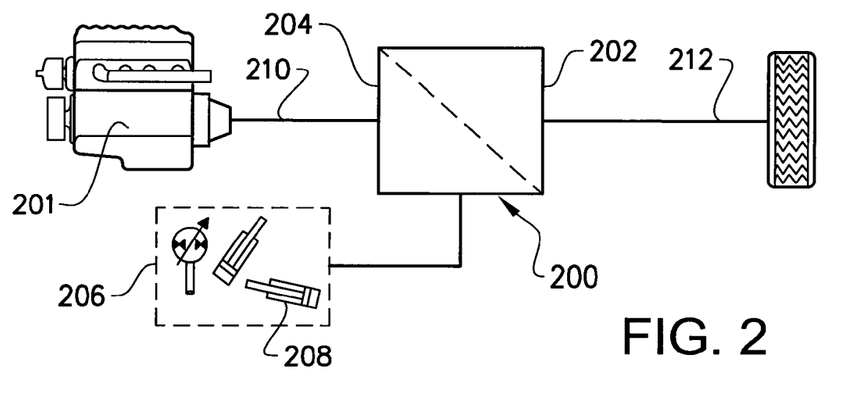
FIG. 2 schematically illustrates a power system according to an example embodiment of the invention.

FIG. 2 schematically illustrates a power system according to one embodiment of the invention. The power system comprises an internal combustion engine 201, a transmission for driving the working machine, wherein the transmission comprises an input shaft 210 mechanically connecting the engine 210 to a variable gear box 200, and an output shaft 212 mechanically connecting the variable gear box 200 to wheels for propulsion of the vehicle. The variable gear box 200 comprises a gear unit 202 and a hydraulic variator unit 204, and the variator unit is also connected to a work hydraulic circuit 206 controlling at least one hydraulic actuator 208 of a working machine. The variable gear box 200 ma be referred to as a continuously variable gear box 200. The gear unit 202 comprises at least a first planetary gear train operatively connected to the variator unit 204.

Furthermore, the hydraulic variator unit 204 is hydraulically connected to the work hydraulic circuit 206 to hydraulically transfer energy from the hydraulic variator unit 204 to the work hydraulic circuit 206.

Figure 3:
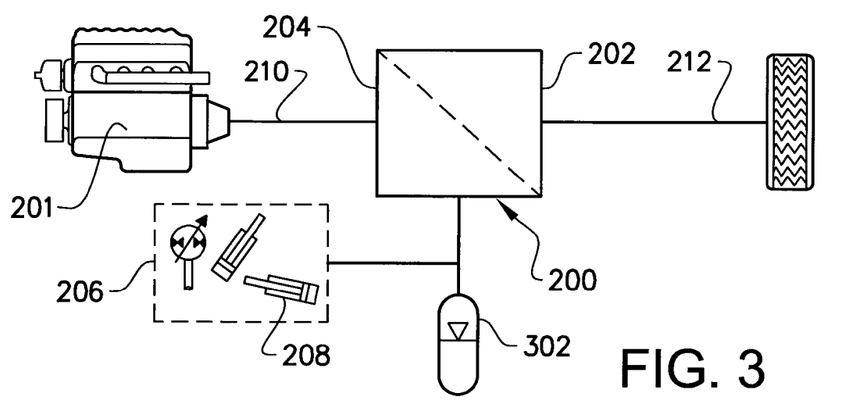
FIG. 3 schematically illustrates a power system according to an example embodiment of the invention.

FIG. 3 is a schematic illustration of a power system according to one embodiment of the invention where a hydraulic energy storage 302 is added. By providing the hydraulic energy storage 302, hydraulic energy may be transferred from the variator unit 204 to the energy storage 302 and in turn from the energy storage 302 to the hydraulic work circuit 206. Through the embodiments of a power system discussed in relation to FIG. 2 and FIG. 3, a hybrid power system is provided which can be made both cheaper and more energy efficient compared to known prior art systems where a separate hydraulic machine traditionally is used for providing power to the work hydraulic circuit. In comparison, an electric hybrid solution using a battery must include a converter for transforming electric energy into hydraulic energy. Such an energy conversion typically infers an energy loss, which can be avoided by using a hydraulic accumulator. Accordingly, by using a hydraulic energy storage and by eliminating the need for one hydraulic machine, the size of the engine may be reduced and the overall power system can be simplified and the cost can be reduced.

Figure 4:
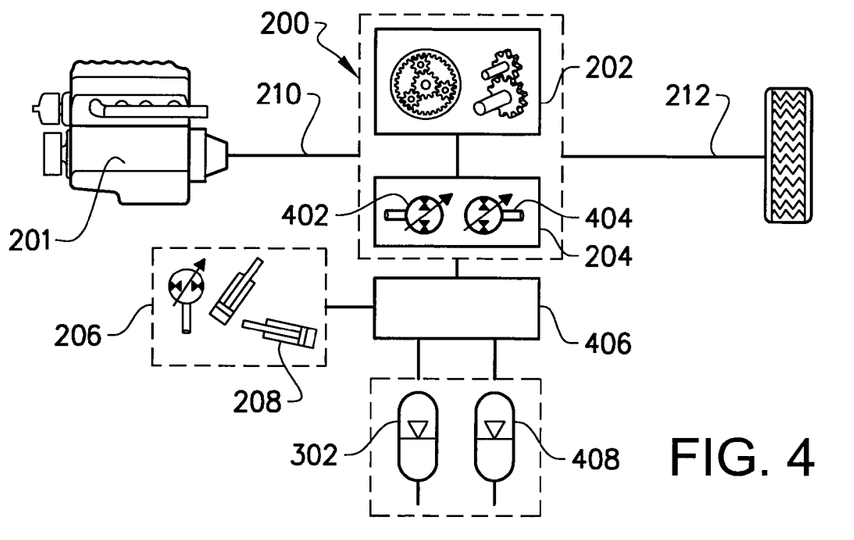
FIG. 4 schematically illustrates a power system according to an example embodiment of the invention.

The variator unit 204 typically includes two hydraulic machines, 402, 404, as illustrated in FIG. 4, where each hydraulic machine 402, 404 has one mechanical connection connecting the hydraulic machine to the gear unit 202 and two hydraulic connections for connecting to the hydraulic portion of the power system. The hydraulic machines illustrated here are of the variable displacement type. Furthermore, FIG. 4 illustrates a power system comprising a high-pressure hydraulic accumulator 302 and a low-pressure hydraulic accumulator 408. A low pressure accumulator may advantageously be connected to a low pressure side of the hydraulic machine as it in general allow the hydraulic machines to operate at a higher rpm. However, a hydraulic tank being held at an elevated pressure, for example by using relatively large feeding pump, may equally well he used instead of a low pressure hydraulic accumulator. The two hydraulic machines 402, 404 may be connected to the same hydraulic node, or they may be separated by hydraulic valves such that it is possible to connect only one of the hydraulic machines to a hydraulic output node of the variator.

A hydraulic machine used in the present configuration can be configured differently compared to a hydraulic machine used in a conventional PS-CVT system. For example, a "two-quadrant machine" may be used instead of a "four-quadrant machine". A two quadrant machine may also be referred to as an over center open-circuit machine. Open circuit means that it is sufficient that the hydraulic machine is provided with a low pressure on a first side and a high pressure on a second side, in comparison the hydraulic machines in conventional PS-CVT systems requiring that hydraulic machines may have alternating high and low pressure on both ports. However, it is not required that hydraulic machines according to various embodiments of the present invention are center open-circuit machines.

A valve block 406 comprising a matrix of controllable logical valves is configured to allow all ports of the valve block 406 to be connected to each other, i.e. so that all of the components of the power system can be connected to each other, depending on what is required in a particular mode of operation. However, the valve block may also be provided only with the valves required to perform specific modes of operation of the power system. Thereby, the valve block can be simplified as it may not be required to provide hydraulic connections between all ports of the block. Furthermore, in practice, logical-type hydraulic valves may be used to provide the desired connections.

A difference compared to traditional PS-CVT solutions is that the variator unit 204 as discussed in relation to the embodiments illustrated by FIG. 3 and FIG. 4 is connected to an energy storage 302. This will give rise to new opportunities how to configure the mechanical part of the transmission system.

Figure 5:
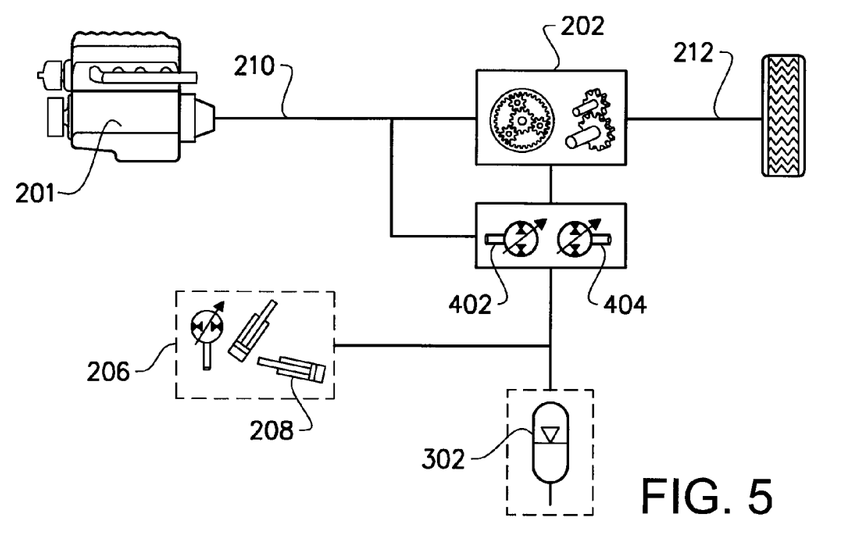
FIG. 5 is an illustration of a configuration of a gear box according to an example embodiment of the invention.
Figure 6:
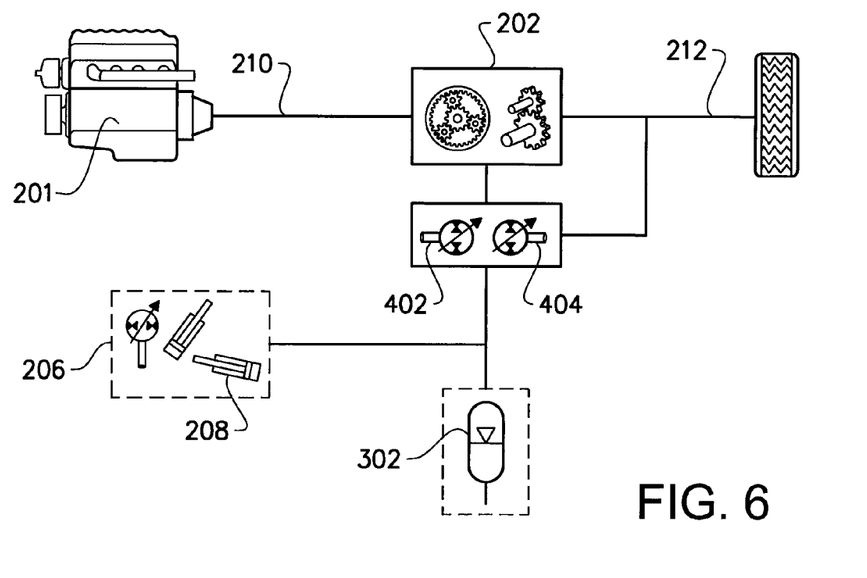
FIG. 6 is an illustration of a configuration of a gear box in a power system according to example embodiments of the invention.

Although many different combinations exist in practice, in general, the gear box 200 may either be input coupled as illustrated in FIG. 5, or output coupled as illustrated in FIG. 6. In an input coupled gear box, one of the hydraulic machines 402 is always mechanically connected to the input shaft 210 of the gear box 200. Correspondingly, in an output coupled gear box, one of the hydraulic machines 404 is always mechanically connected to the output shaft 212 of the gear box. The mechanical connection between the hydraulic machine and the input or output shaft may comprise a certain gear ratio to gear up or down the speed of the hydraulic machine relative to the axle it is connected to.

Different topologies are possible both for an input coupled and output coupled gear box. For example, for a one-mode transmission, the planetary gear can be mounted in at least three different configurations according to FIGS. 7a-c.

Figure 7A:
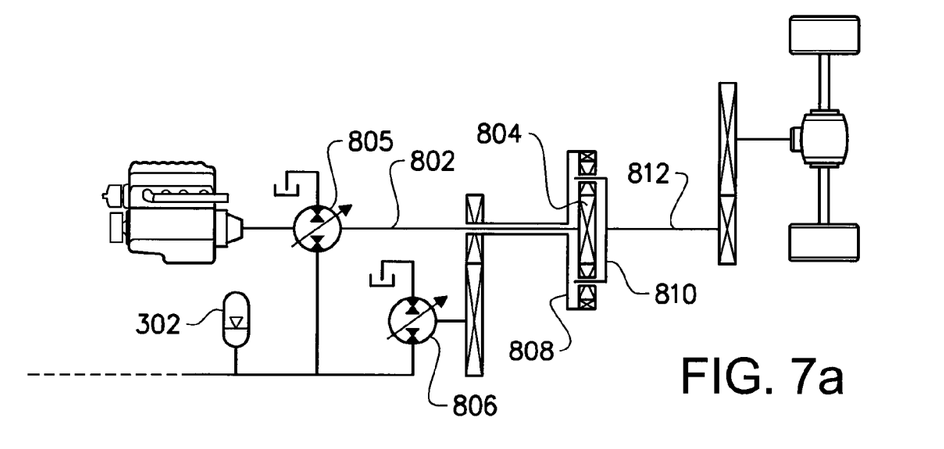
Figure 7B:
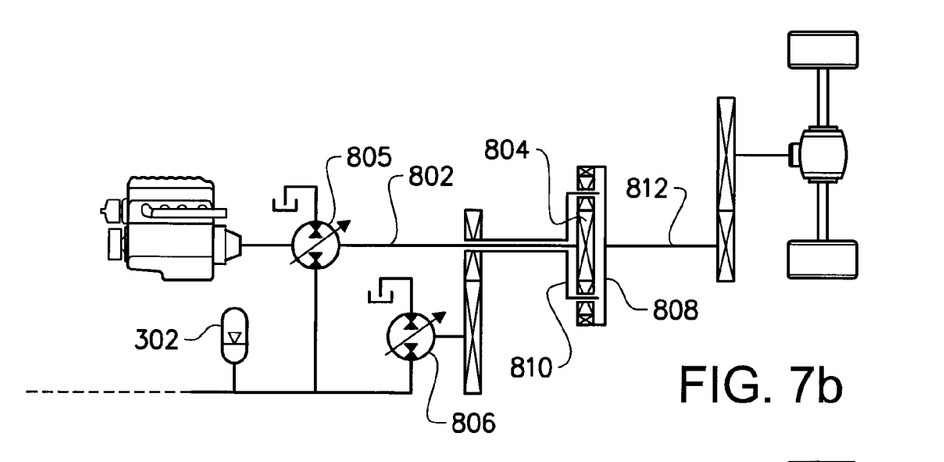
Figure 7C:
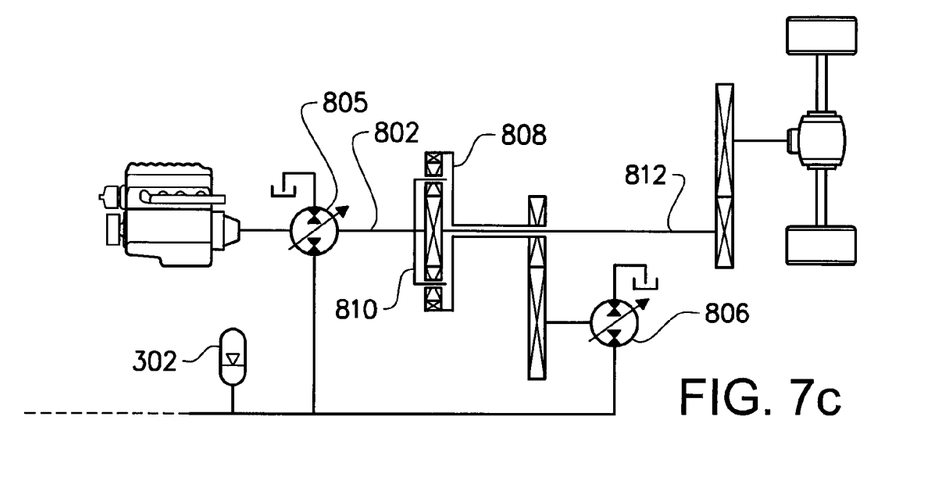

In FIG. 7a, the input shaft 802 is connected to the sun wheel 804 and the hydraulic machine 806 is connected to the ring wheel 808 (typical input-coupled architecture). In FIG. 8b, the input shaft 802 is connected to the sun wheel 804 and hydraulic machine 806 is connected to the carrier 810. In FIG. 7c, the input shaft 802 is connected to the carrier 810 and the hydraulic machine 806 is connected to the ring wheel 808.

All of the configurations of FIG. 7a-c should be characterized as input-coupled transmissions, since one hydraulic machine 805 is always connected to the input shaft 802, even though the arrangement with the planetary gear can be similar in an output-coupled transmission. The only difference between the configurations is how the input shaft 802, the second hydraulic unit 806 and the output shaft 812 are connected to the planetary gear. These three configurations are possible configurations for a one-mode transmission (the functionality does not change if the sun wheel and the ring wheel are switched).

One or more of the hydraulic machines comprised in the variator unit may advantageously be configured as a hydraulic system according to the following discussion in relation to FIGS. 8-11.

Figure 8:
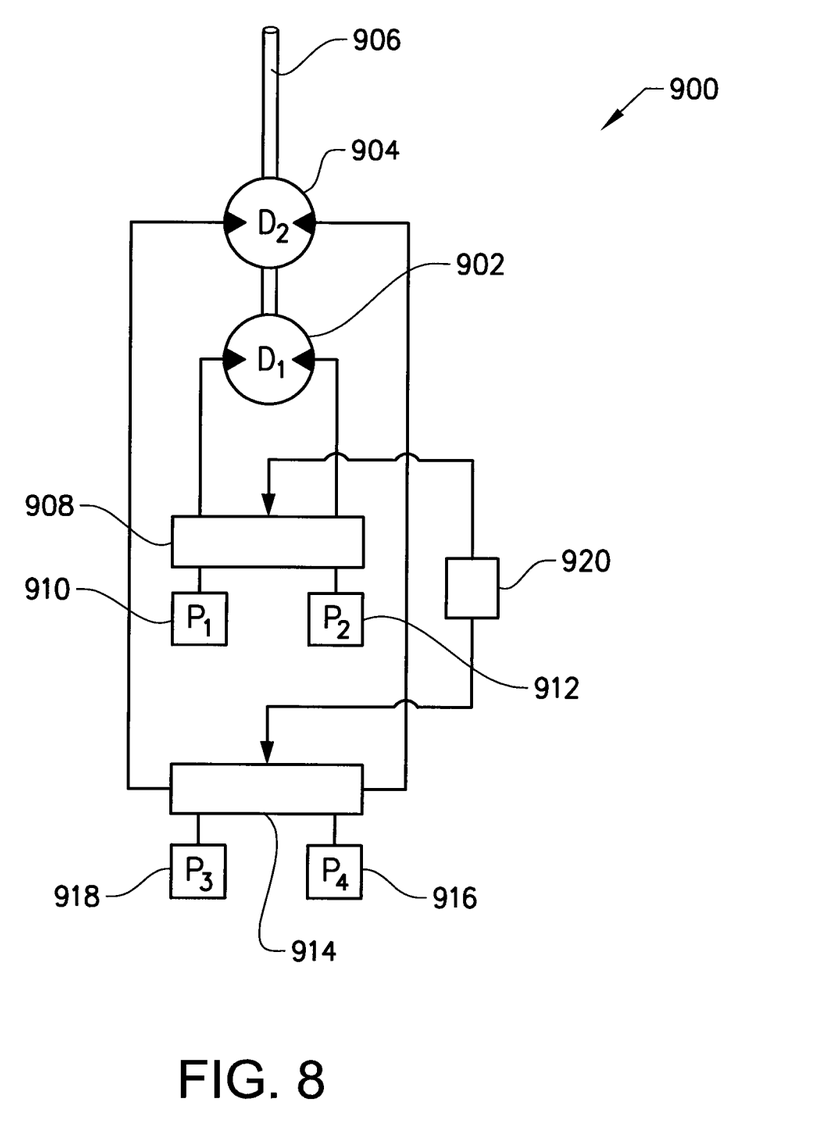
FIG. 8 schematically illustrates a hydraulic system according to an example embodiment of the invention.

FIG. 8 schematically illustrates a hydraulic system 900 according to one embodiment of the invention. The hydraulic system 900 comprises a first rotating hydraulic machine 902 having a displacement Di and a second rotating hydraulic machine 904 having a displacement D2, both being arranged to provide a torque via a common output shaft 906.

The hydraulic system 900 further comprises a first valve means 908 for providing a differential hydraulic pressure level over the first hydraulic machine 902 by using two sources of hydraulic fluid 910, 912 having different hydraulic pressure levels Pi and P2, a second valve means 914 for providing a differential hydraulic pressure level over the second hydraulic machine 904 by using two sources of hydraulic fluid 916, 918 having different hydraulic pressure levels P3 and P4, and a control unit 920 configured to control the first valve means 908 and the second valve means 914 such that different discrete levels of torque are provided via the output shaft 906 of the hydraulic system 900. The torque T provided to the output shaft from each hydraulic machine correspond to the differential hydraulic pressure times the displacement of the respective motor as T1=$\Delta$P1*D1 and T2=$\Delta$P2*D2 where $\Delta$P1=P1−P2 and $\Delta$P2=P3−P4. For example, the maximum output torque TmaX then becomes Tmax=$\Delta$P1*D1+$\Delta$P2*D2. If both sides of each hydraulic machine may be connected to the higher pressure, the differential pressure may be $\Delta$P=P1−P2 or $\Delta$P=P2−P1 i.e. $\Delta$P=±|Pi−P2|.

Accordingly, different discrete levels of torque can be provided in both rotary directions of the output shaft by controlling the first and second valve means to provide the differential pressure to one or both of the hydraulic machines, and by controlling to which side of the respective hydraulic machine the high pressure and the low pressure is connected. In the above example, provided that either $\Delta$P1≠$\Delta$P2 or D1≠D2 and assuming that T2>T1, four different discrete levels of torque can be provided in each rotary direction, namely T1, T2, T2−T1 and T1+T2. Moreover, two different differential pressure levels may be provided by three sources of hydraulic fluid having different pressure levels. Thus, above function of the hydraulic system in FIG. 8 would for example be achieved if P2=P3, and the two sources of hydraulic fluid 912 and 918 may be replaced by one source of hydraulic fluid.

Figure 9:
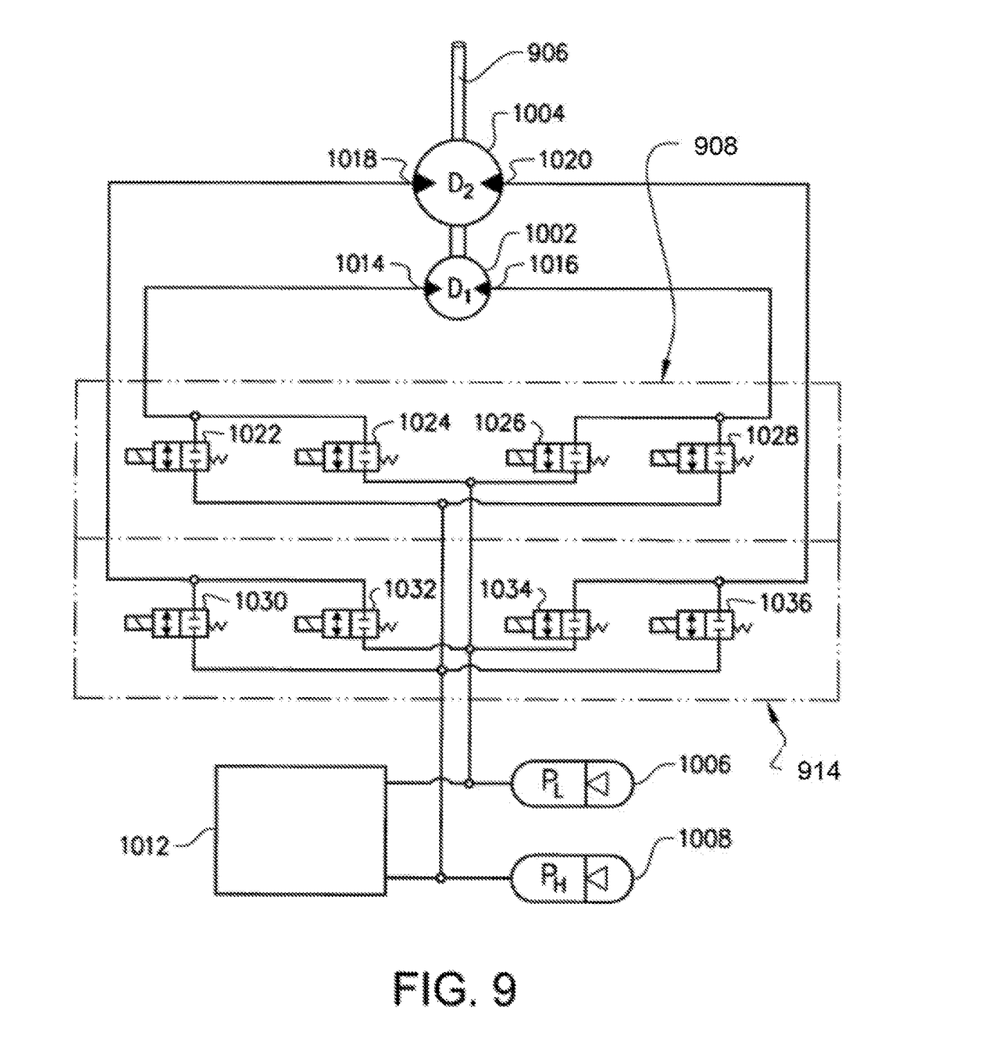
FIG. 9 schematically illustrates a hydraulic system according to an example embodiment of the invention.

FIG. 9 schematically illustrates a more detailed example embodiment of the general concept illustrated in FIG. 8. In FIG. 9, the first hydraulic machine 1002 has a fixed displacement Di which is smaller than a fixed displacement D2 of the second hydraulic machine 1004. Fixed displacement hydraulic machines are advantageously used as they can be made more energy efficient compared to variable displacement hydraulic machines. Thereby, the amount torque provided by each hydraulic machine is determined by the differential pressure applied over each hydraulic machine. Furthermore, the first valve means 908 and the second valve means 914 typically comprise a plurality of discrete valves. As it is desirable to provide a simple and relatively inexpensive system, logical on/off valves may advantageously he used since such valves can provide a low complexity and thereby be made at a low cost.

The hydraulic system of FIG. 9 also comprises hydraulic accumulators 1006, 1008 as means for providing hydraulic fluid having different pressure levels, PL and PH. By coupling the hydraulic accumulators to selected sides of each hydraulic machine, different constant differential pressure levels can be provided over each of the hydraulic machines. Furthermore, the hydraulic system may advantageously comprise an accumulator charging system 1012 such as a hydraulic pump connected to an engine of a vehicle in which the hydraulic system is arranged. Through the hydraulic charging system, the pressure levels in the hydraulic accumulators 1006, 1008 may be maintained within predetermined pressure ranges.

In particular, the valves in FIG. 9 are arranged so that:
PL is connected to the first side 1014 of the first hydraulic machine 1002 via valve 1024;
PL is connected to the second side 1016 of the first hydraulic machine 1002 via valve 1026;
PL is connected to the first side 1018 of the second hydraulic, machine 1004 via valve 1032;
PL is connected to the second side 1020 of the second hydraulic machine 1004 via valve 1034;
PH is connected to the first side 1014 of the first hydraulic machine 1002 via valve 1022;
PH is connected to the second side 1016 of the first hydraulic machine 1002 via valve 1028
PH is connected to the first side 1018 of the second hydraulic machine 1004 via valve 1030; and
PH is connected to the second side 1020 of the second hydraulic machine 1004 via valve 1036.

In the present description the valves are presented by on/off valves, also referred to as digital valves based on their functionality as a logical switch controlling a flow of hydraulic fluid by being either fully open or fully closed. However, the same functionality may of course be provided by proportional servo valves, or other types of hydraulic valves, if used as on/off valves.

Figure 10A:
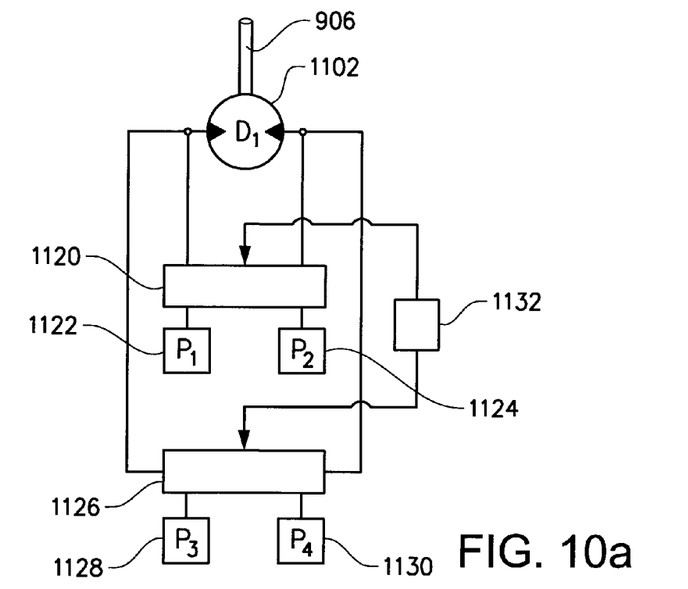

FIG. 10a schematically illustrates a hydraulic system comprising a fixed displacement hydraulic machine 1102 where at least two different discrete levels of output torque via a first valve means 1120 and a second valve means 1126. Each of the valve means are connected to two sources of hydraulic fluid having different pressure levels, the first valve means 1120 being connected to sources 1122 and 1124 having pressure levels P-i and P2, and the second valve means 1126 being connected to sources 1128 and 1130 having pressure levels P3 and P4. The pressure levels Pi to P4 are selected such that an absolute value of a differential hydraulic pressure level provided by the first valve means 1120 is different from an absolute value of a differential hydraulic pressure level provided by the second valve means 1126. The valve means 1120 and 1126 are further controlled by a control unit 32.

Figure 10B:
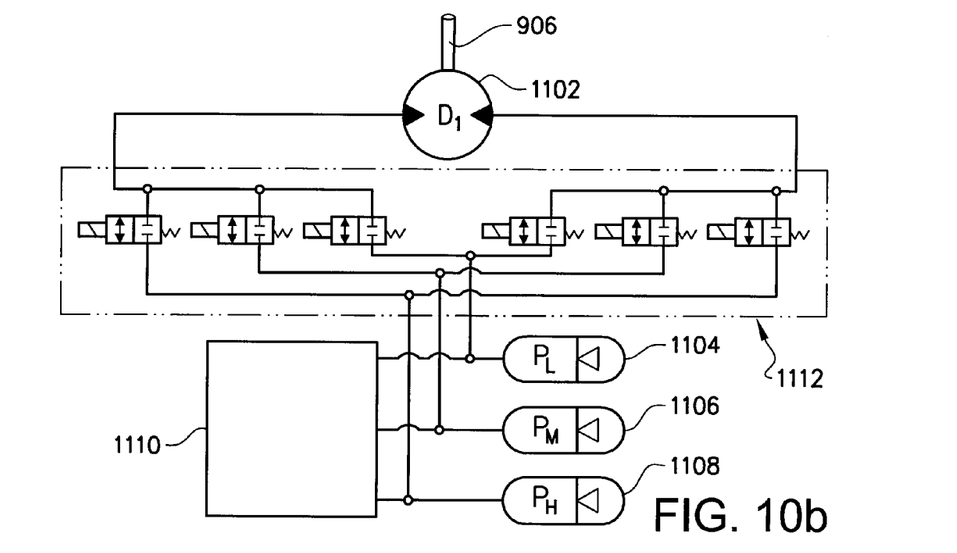

FIG. 10b discloses an example embodiment of the hydraulic system where different discrete levels of torque may be provided through the rotating hydraulic machine 1102 having a fixed displacement D1, and three different pressure levels, here provided by three hydraulic accumulators 1104, 1106, and 1108 having pressure levels PL, PM, and PH, respectively. As illustrated in Fig. 10b, it is readily realized that two different differential pressure levels may be provided to the hydraulic machine 1102 if the first valve means 1120 and the second valve means 1126 are integrated and connected to three sources of hydraulic fluid having different pressure levels. The different differential pressure levels may be applied to the hydraulic machine 1102 via the valve means 1112 in a similar manner as described in relation to Fig. 9. The system also comprises an accumulator charging system 1110 for providing pressure to the hydraulic accumulators 1104, 1106, and 1108, In FIG. 10b, assuming that PL<PM<PH and that each accumulator 1104, 1106, 1108 may be connected to both sides of the hydraulic machine 102, the following six differential pressures may be provided over the hydraulic machine: ±(PM−PL), ±(PH−PL) and ±(PH−PM).

Figure 11:
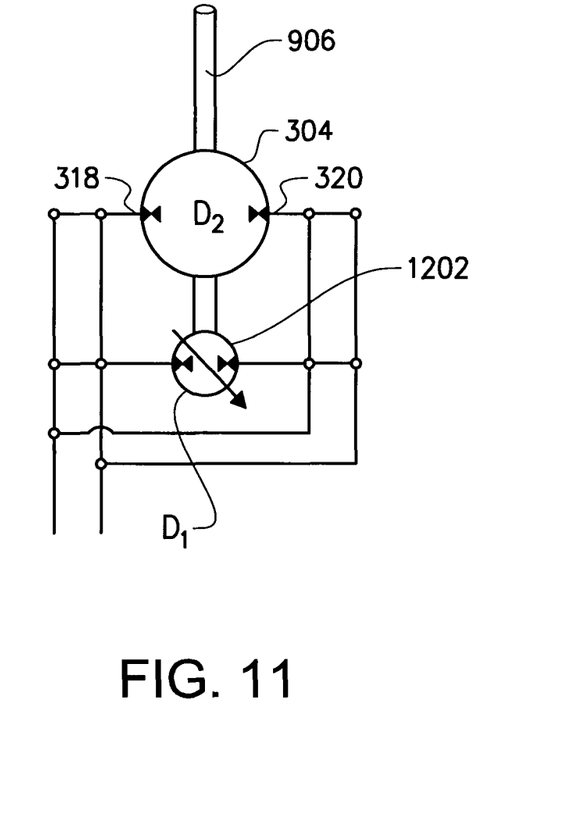
FIG. 11 schematically illustrates a hydraulic system according to an example embodiment of the invention.

FIG. 11 illustrates a hydraulic system similar to the hydraulic system of FIG. 9, with the difference that a hydraulic machine 1202 having a variable displacement has been included and arranged to provide a torque to the output shaft together with the fixed displacement hydraulic machine. The variable displacement hydraulic machine 1202 may also be connected to each of the hydraulic accumulators via on/off valves in the same way as the hydraulic machine 1002 in FIG. 9. However, it is in principle sufficient that the fixed displacement hydraulic machine 1202 is only connected to one of the hydraulic accumulators, preferably the one having the highest pressure level. In principle, it is sufficient that the variable displacement hydraulic machine 1202 has a maximum displacement which is equal to or lower than the lowest displacement of the fixed displacement hydraulic machines. Thereby, an energy efficient hydraulic system is provided utilizing the advantages of fixed displacement hydraulic machines which can also provide a continuously variable output torque through the use of a variable displacement hydraulic machine of relatively small size.

Although the invention has been described in relation to specific combinations components in the power system, the components may be combined in other configurations as well which is dear for the skilled person when studying the present application. In particular, many different configurations of the gear box are possible, and the embodiments provided herein are merely some examples of possible configurations. Thus, the above description of the example embodiment of the present invention and the accompanying drawings are to be regarded as a non-limiting example of the invention and the scope of protection is defined by the appended claims. Any reference sign in the claims should not be construed as limiting the scope.

The invention claimed is:

1. A power system for a working machine, the power system comprising:
   a transmission for driving the working machine, the transmission comprising a continuously variable gear box having a gear unit and a hydraulic variator unit;
   a work hydraulic circuit for controlling at least one hydraulic actuator of the working machine;
   wherein the hydraulic variator unit is hydraulically connected to the work hydraulic circuit to hydraulically transfer energy from the hydraulic variator unit to the work hydraulic circuit, wherein the hydraulic variator unit comprises a primary hydraulic machine and a secondary hydraulic machine, wherein at least one of the primary hydraulic machine and the secondary hydraulic machine is hydraulically connected to the work hydraulic circuit; and
   wherein the primary and secondary hydraulic machine comprises:
      a first rotating hydraulic machine and a second rotating hydraulic machine, the first rotating hydraulic machine and second rotating hydraulic machine being arranged to provide a torque via a common output shaft;
      a first valve means for providing a differential hydraulic pressure level over the first rotating hydraulic machine by using two sources of hydraulic fluid having different hydraulic pressure levels;
      a second valve means for providing a differential hydraulic pressure level over the second rotating hydraulic machine by using two sources of hydraulic fluid having different hydraulic pressure levels; and
      a control unit configured to control the first valve means and the second valve means such that different discrete levels of torque are provided via the output shaft,
   wherein the first rotating hydraulic machine and the second rotating hydraulic machine are separate machines.

2. The power system according to claim 1, further comprising a hydraulic energy storage hydraulically connected to the hydraulic variator unit.

3. The power system according to claim 2, wherein the power system is configured to hydraulically transfer energy from the variator unit to the hydraulic energy storage.

4. The power system according to claim 2, wherein the power system is configured to hydraulically transfer energy from the hydraulic energy storage to the variator unit.

5. The power system according to claim 2, wherein the hydraulic energy storage is hydraulically connected to the work hydraulic circuit.

6. The power system according to claim 5, wherein the power system is configured to hydraulically transfer energy from the hydraulic energy storage to the work hydraulic circuit.

7. The power system according to claim 5, wherein the power system is configured to hydraulically transfer energy from the work hydraulic circuit to the hydraulic energy storage.

8. The power system according to claim 1, further configured to hydraulically transfer energy from the work hydraulic circuit to the hydraulic variator unit.

9. The power system according to claim 2, further comprising a control unit configured to maintain a pressure level of the hydraulic energy storage within a first predetermined range.

10. The power system according to claim 2, further comprising a second hydraulic energy storage hydraulically connected to the hydraulic variator unit and to the work hydraulic circuit.

11. The power system according to claim 10, wherein the control unit is configured to maintain a pressure level of the second hydraulic energy storage within a second predetermined range different from the first predetermined range.

12. The power system according to claim 1, wherein the variator unit is input coupled.

13. The power system according to claim 1, wherein the variator unit is output coupled.

14. The power system according to claim 1, wherein the work hydraulic circuit comprises a digital hydraulic actuator.

15. The power system according to claim 1, wherein at least one of the first rotating hydraulic machine and the second rotating hydraulic machine is a fixed displacement hydraulic machine.

16. The power system according to claim 1, wherein the valve means comprises on/off valves.

17. A working machine comprising a power system according to claim 1.

18. A power system for a working machine, the power system comprising:
   a transmission for driving the working machine, the transmission comprising a continuously variable gear box having a gear unit and a hydraulic variator unit;
   a work hydraulic circuit for controlling at least one hydraulic actuator of the working machine;
   wherein the hydraulic variator unit is hydraulically connected to the work hydraulic circuit to hydraulically transfer energy from the hydraulic variator unit to the work hydraulic circuit, wherein the hydraulic variator unit comprises a primary hydraulic machine and a secondary hydraulic machine, wherein at least one of the primary hydraulic machine and the secondary hydraulic machine is hydraulically connected to the work hydraulic circuit; and wherein the primary and secondary hydraulic machine comprises:
- a first rotating hydraulic machine and a second rotating hydraulic machine, the first rotating hydraulic machine and second rotating hydraulic machine being arranged to provide a torque via a common output shaft;
- a first valve means for providing a differential hydraulic pressure level over the first rotating hydraulic machine by using two sources of hydraulic fluid having different hydraulic pressure levels;
- a second valve means for providing a differential hydraulic pressure level over the second rotating hydraulic machine by using two sources of hydraulic fluid having different hydraulic pressure levels; and
- a control unit configured to control the first valve means and the second valve means such that different discrete levels of torque are provided via the output shaft, wherein the first rotating hydraulic machine is a fixed displacement hydraulic machine and the second rotating hydraulic machine is a variable displacement hydraulic machine.

19. A power system for a working machine, the power system comprising:
- a transmission for driving the working machine, the transmission comprising a continuously variable gear box having a gear unit and a hydraulic variator unit;
- a work hydraulic circuit for controlling at least one hydraulic actuator of the working machine;
- wherein the hydraulic variator unit is hydraulically connected to the work hydraulic circuit to hydraulically transfer energy from the hydraulic variator unit to the work hydraulic circuit, wherein the hydraulic variator unit comprises a primary hydraulic machine and a secondary hydraulic machine, wherein at least one of the primary hydraulic machine and the secondary hydraulic machine is hydraulically connected to the work hydraulic circuit; and wherein the primary and secondary hydraulic machine comprises:
- a first rotating hydraulic machine and a second rotating hydraulic machine, the first rotating hydraulic machine and second rotating hydraulic machine being arranged to provide a torque via a common output shaft;
- a first valve means for providing a differential hydraulic pressure level over the first rotating hydraulic machine by using two sources of hydraulic fluid having different hydraulic pressure levels;
- a second valve means for providing a differential hydraulic pressure level over the second rotating hydraulic machine by using two sources of hydraulic fluid having different hydraulic pressure levels; and
- a control unit configured to control the first valve means and the second valve means such that different discrete levels of torque are provided via the output shaft, wherein at least one of the differential hydraulic pressure level over the first rotating hydraulic machine and the differential hydraulic pressure level over the second rotating hydraulic machine is provided by using a first hydraulic accumulator having a first hydraulic pressure level and a second hydraulic accumulator having a second hydraulic pressure level, the first hydraulic pressure level being different from the second hydraulic pressure level.

* * * * *